US012520405B2

(12) United States Patent
Borra et al.

(10) Patent No.: US 12,520,405 B2
(45) Date of Patent: Jan. 6, 2026

(54) CONDITIONALLY ADJUSTING LIGHT EFFECT BASED ON SECOND AUDIO CHANNEL CONTENT

(71) Applicant: SIGNIFY HOLDING B.V., Eindhoven (NL)

(72) Inventors: Tobias Borra, Rijswijk (NL); Dzmitry Viktorovich Aliakseyeu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 108 days.

(21) Appl. No.: 18/694,453

(22) PCT Filed: Sep. 20, 2022

(86) PCT No.: PCT/EP2022/076083

§ 371 (c)(1),
(2) Date: Mar. 22, 2024

(87) PCT Pub. No.: WO2023/046673

PCT Pub. Date: Mar. 30, 2023

(65) Prior Publication Data

US 2024/0397596 A1 Nov. 28, 2024

(30) Foreign Application Priority Data

Sep. 24, 2021 (EP) .................................... 21198736

(51) Int. Cl.
*H05B 47/105* (2020.01)
*H04R 1/26* (2006.01)
(Continued)

(52) U.S. Cl.
CPC ............ *H05B 47/105* (2020.01); *H04R 1/26* (2013.01); *H04R 29/008* (2013.01);
(Continued)

(58) Field of Classification Search
CPC ...... H05B 47/105; H05B 45/20; H05B 47/11; H05B 47/19; H05B 47/125; H05B 47/13;
(Continued)

(56) References Cited

U.S. PATENT DOCUMENTS 9,763,021 B1 * 9/2017 Peeler .................. H05B 47/105
11,627,425 B2 * 4/2023 Fuhrmann .............. H04R 1/326
381/56

(Continued)

FOREIGN PATENT DOCUMENTS

WO 2018095861 A1 5/2018
WO 2020089144 A1 5/2020

*Primary Examiner* — Monica C King

(57) ABSTRACT

A system for controlling a plurality of lighting devices (11-15) to render light effects accompanying a rendering of audiovisual content (81) is configured to associate, based on a first characteristic of a first audio channel/object (86), the first audio channel/object with a first lighting device (12) and not with a second lighting device (13). The first characteristic is indicative of an audio source position. The system is further configured to associate a second audio channel (87) with the first and second lighting devices. The system is further configured to determine whether second audio content in the second audio channel meets predetermined criteria and determine a first light effect based on a determined chromaticity. If the one or more predetermined criteria are not met, the light intensity is based on first audio content in the first audio channel/object, and otherwise, the light intensity is based on the second audio content.

14 Claims, 6 Drawing Sheets

(51) Int. Cl.

| | |
|---|---|
| ***H04R 29/00*** | (2006.01) |
| ***H05B 47/155*** | (2020.01) |
| ***H05B 47/175*** | (2020.01) |
| ***H05B 47/19*** | (2020.01) |

(52) U.S. Cl.
CPC ....... *H05B 47/155* (2020.01); *H05B 47/1965* (2024.01); *H05B 47/19* (2020.01)

(58) Field of Classification Search
CPC ...... H05B 47/115; H05B 45/10; H05B 45/12; H05B 47/155; H05B 47/1965; H05B 47/12; H05B 47/172; H05B 47/1985; H05B 47/165; H05B 47/196; H05B 47/197; H05B 47/1975; H05B 47/198; H05B 1/0244; H05B 2203/021; H05B 45/325; H05B 45/33; H05B 45/355; H05B 45/357; H05B 45/3578; H05B 45/37; H05B 47/175; H04R 1/406; H04R 3/005; H04R 1/028; H04R 1/1041; H04R 1/403; H04R 2201/403; H04R 2201/405; H04R 5/04; H04R 2499/15; H04R 2460/13; H04R 29/008; H04R 3/002; H04R 5/033; H04R 2430/20; H04R 1/1008; H04R 1/1083; H04R 1/1091; H04R 1/323; H04R 2201/401; H04R 2203/12; H04R 2430/03; H04R 2499/11; H04R 3/12; H04R 3/14; H04R 5/027; H04R 1/1016; H04R 1/1075; H04R 1/26; H04R 1/2873; H04R 1/326; H04R 1/347; H04R 2400/11; H04R 2420/07; H04R 3/04; H04R 7/10; H04R 7/18; H04R 7/20; H04R 7/26; H04R 9/025; H04R 9/045; H04R 9/046; H04R 9/063
See application file for complete search history.

(56) References Cited

U.S. PATENT DOCUMENTS

| | | | | |
|---|---|---|---|---|
| 12,016,100 | B1 * | 6/2024 | Jagmag | H05B 47/165 |
| 12,149,772 | B2 * | 11/2024 | du Plooy | H04N 21/43079 |
| 2010/0213873 | A1 * | 8/2010 | Picard | H05B 47/155 315/297 |
| 2010/0265414 | A1 * | 10/2010 | Nieuwlands | H04N 21/4394 348/739 |
| 2019/0166674 | A1 | 5/2019 | Mason et al. | |

* cited by examiner

CONDITIONALLY ADJUSTING LIGHT EFFECT BASED ON SECOND AUDIO CHANNEL CONTENT

CROSS-REFERENCE TO PRIOR APPLICATIONS

This application is the U.S. National Phase application under 35 U.S.C. § 371 of International Application No. PCT/EP2022/076083, filed on Sep. 20, 2022, which claims the benefit of European Patent Application No. 21198736.7, filed on Sep. 24, 2021. These applications are hereby incorporated by reference herein.

FIELD OF THE INVENTION

The invention relates to a system for controlling a plurality of lighting devices to render light effects accompanying a rendering of audiovisual content, said audiovisual content comprising an audio portion and a video portion, said audio portion comprising multiple audio channels.

The invention further relates to a method of controlling a plurality of lighting devices to render light effects accompanying a rendering of audiovisual content, said audiovisual content comprising an audio portion and a video portion, said audio portion comprising multiple audio channels.

The invention also relates to a computer program product enabling a computer system to perform such a method.

BACKGROUND OF THE INVENTION

The experience of content, visual or auditory, can benefit immensely from a dynamic lighting system. An entertainment lighting system like e.g., Hue Sync, can dramatically alter a user's viewing experience by rendering light colors that are extracted from a scene in real-time, or scripted offline. In addition to this, the accompanying audio of the content could be taken into account, where e.g., the intensity of the audio can be used to modulate the rendered light effects.

For example, US 2010/265414 A1 discloses that a scene accompanied by high intensity audio may be rendered with higher intensity light effects than the same scene accompanied by low intensity audio. US 2010/265414 A1 further discloses that video-based ambient lighting characteristics intended for presentation on a left side of a display may be combined with audio-based ambient lighting data relating to a left channel while a video-based ambient lighting characteristics intended for presentation on a right side of the display may be combined with audio-based ambient lighting data relating to a right-channel.

It is a drawback of US 2010/265414 A1 that the disclosed system does not take advantage of newer audio formats to create enhanced ambient lighting effects which are based both on a video portion and an audio portion of the audiovisual content.

SUMMARY OF THE INVENTION

It is a first object of the invention to provide a system, which is able to create enhanced ambient lighting effects which are based both on a video portion and an audio portion of the audiovisual content.

It is a second object of the invention to provide a method, which can be used to create enhanced ambient lighting effects which are based both on a video portion and an audio portion of the audiovisual content.

In a first aspect of the invention, a system for controlling a plurality of lighting devices to render light effects accompanying a rendering of audiovisual content, said audiovisual content comprising an audio portion and a video portion, said audio portion comprising multiple audio channels, comprises at least one input interface, at least one transmitter, and at least one processor configured to obtain said audiovisual content via said at least one input interface, determine a first characteristic of a first audio channel of said multiple audio channels or of an audio object comprised in said audio portion, said first characteristic being indicative of an audio source position, and associate, based on said first characteristic, said first audio channel or said audio object with a first lighting device of said plurality of lighting devices, wherein said associating is based on said audio source position relative to a position of said first lighting device.

The at least one processor is further configured to determine a second characteristic of a second audio channel of said multiple audio channels, associate, based on said second characteristic, said second audio channel with said first lighting device and with a second lighting device of said plurality of lighting devices, said first audio channel not being associated with said second lighting device, determine whether second audio content in said second audio channel meets one or more predetermined criteria, determine at least a chromaticity based on said video portion of said audiovisual content, determine a first light effect based on said determined chromaticity, wherein if said one or more predetermined criteria are not met, the light intensity of said first light effect is based on first audio content in said first audio channel or in said audio object, and if said one or more predetermined criteria are met, the light intensity of said first light effect is based on said second audio content in said second audio channel, and control, via said at least one transmitter, said first lighting device to render said first light effect.

More and more people are enjoying surround sound configurations at home and most TV programs and movies have surround sound audio nowadays. By taking the semantic properties of the audio channels and optionally audio objects into account when determining the light effects, it becomes possible to determine light effects which reflect what is happening in the audio channels and optionally audio objects and thereby realize a more immersive entertainment experience.

This is achieved by not simply using the intensity of audio content to modulate the light effects but by using the semantics of the audio channels and optionally audio objects to modulate the light effects. For example, the low frequency effects (subwoofer) channel may influence all connected lights such that bass-heavy effects like a loud explosion are not only heard but also seen throughout the entire entertainment area. This can be contrasted to audio effects on left/right audio channels (also referred to as side channels) which may be used to modulate light effects on only the left/right positioned lighting devices.

With the above-described system, a first audio channel or audio object may be mapped to a first lighting device based on an audio source position associated with the first audio channel relative to a position of the first lighting device and a second audio channel may be mapped to multiple lighting devices including the first lighting device. A sound effect reproduced on the first audio channel or audio object can be located more precisely by the user than a sound effect reproduced on the second audio channel, e.g., because the second audio channel is a low frequency effects (subwoofer) channel.

By mapping the first audio channel or audio object to fewer lighting devices, e.g., a single lighting device, than the second audio channel, the light effects determined based on first audio content on the first audio channel or audio object reflect that the corresponding sound effect has a more specific location while the light effects determined based on second audio content on the second audio channel reflect that the corresponding sound effect has a less specific location.

By determining the chromaticity (and optionally the entire color) of the light effects based on at least the video portion of the audiovisual content and determining the light intensity of the light effects based on at least the audio portion of the audiovisual content, wherein the light intensity is based on the second audio content in the second audio channel at certain moments, e.g., in case of loud events, the best light experience may be obtained. Optionally, the lightness of the color is also determined based on the audio portion of the audiovisual content.

Said second characteristic might not be indicative of an audio source position. For example, said second characteristic may indicate whether said second audio channel is a low frequency effect channel. Alternatively, said first characteristic may be determined of said audio object and said second characteristic may be indicative of a desired speaker position for said second audio channel, for example.

Said at least one processor may be configured to determine the light intensity of said first light effect further based on said first audio content in said first audio channel or in said audio object if said one or more predetermined criteria are met. By always determining the light intensity based on the first audio content in the first audio channel, a less intense light experience may be obtained, which is preferred by certain users. For example, the highest light intensity may only be achieved if there is a loud event in both the first audio channel and the second audio channel. By always determining the light intensity based on the first audio content in the audio object, the audio objects are emphasized in the light effects.

Said at least one processor may be configured to determine the light intensity of said first light effect further based on said video portion of said audiovisual content. This may be used to ensure that the light intensity not only matches the audio portion but also the video portion. The user may be able to configure whether the light intensity of the light effects should be determined based on the video portion of the audiovisual content.

Said at least one processor may be configured to determine whether said second audio content in said second audio channel meets said one or more predetermined criteria by determining whether an audio intensity of said second audio content exceeds a threshold. Thus, the light intensity may be determined based on the second content in the second audio channel if there is a loud event in the second audio channel, e.g., a loud explosion.

Said at least one processor may be configured to select a spatial region in a current frame of said video portion in dependence on whether said one or more predetermined criteria are met and determine at least said chromaticity from only said selected spatial region. Although the chromaticity (or entire color) of the light effects is preferably determined based on the video portion of the audiovisual content, the audio portion may still have some influence on the chromaticity (or entire color). For example, the color of the light effect for a lighting device positioned on the left may be extracted from a center region of a video frame if a loud event is detected in the low frequency effects channel and from a left region of the video frame otherwise.

Said first characteristic may be determined of said first audio channel and said at least one processor may be configured to determine whether an audio intensity of said first audio content exceeds a threshold, select a spatial region in a current frame of said video portion in dependence on whether said audio intensity of said first audio content exceeds said threshold, and determine at least said chromaticity from only said selected spatial region. From which spatial region of the video portion the chromaticity (or entire color) is extracted may not only depend on the second audio content in the second audio channel but also on the first audio content in the first audio channel. For example, when a loud event is detected in the second audio channel, the light intensity of the light effects for all lighting devices may be determined based on the second audio content in the second audio channel and the color of the light effect for a lighting device positioned on the left may be extracted from a center region of a video frame if the loud event is also detected in the first audio channel and from a left region of the video frame if not.

Said at least one processor may be configured to determine one or more speaker signals for a loudspeaker based on said audio portion of said audiovisual content. Said at least one processor may be configured to determine the light intensity of said first light effect based on said one or more speaker signals. Instead of determining the light intensity of the first light effect directly based on the audio portion of the audiovisual content, the light intensity may be determined based on the one or more speaker signals. This may be beneficial if the user's audio system is not able to recreate the audio source positions specified in the content close enough or if the user's audio system enhances the audio effects specified in the audiovisual content.

As an example of the latter, audio upmixing algorithms exist that create pseudo channels for traditional content that does not comprise those channels (e.g., Dolby Surround, which does not contain height channels). An example of such an upmixing algorithm is DTS Virtual: X. Other audio analysis steps, e.g. determining the first and second characteristics and/or determining whether the second audio content in the second audio channel meets the one or more predetermined criteria, may also be performed based on the one or more speaker signals.

Alternatively, said at least one processor may be configured to determine the light intensity of said first light effect further based on information on available speakers and/or information on used three-dimensional audio virtualization. This may be beneficial if the user's audio system is not able to recreate the audio source positions specified in the content close enough.

In a second aspect of the invention, a method of controlling a plurality of lighting devices to render light effects accompanying a rendering of audiovisual content, said audiovisual content comprising an audio portion and a video portion, said audio portion comprising multiple audio channels, comprises obtaining said audiovisual content, determining a first characteristic of a first audio channel of said multiple audio channels or of an audio object comprised in said audio portion, said first characteristic being indicative of an audio source position, and associating, based on said first characteristic, said first audio channel or said audio object with a first lighting device of said plurality of lighting devices, wherein said associating is based on said audio source position relative to a position of said first lighting device.

Said method further comprises determining a second characteristic of a second audio channel of said multiple audio channels, associating, based on said second characteristic, said second audio channel with said first lighting device and with a second lighting device of said plurality of lighting devices, said first audio channel not being associated with said second lighting device, determining whether second audio content in said second audio channel meets one or more predetermined criteria, determining at least a chromaticity based on said video portion of said audiovisual content, determining a first light effect based on said determined chromaticity, wherein if said one or more predetermined criteria are not met, the light intensity of said first light effect is based on first audio content in said first audio channel, and if said one or more predetermined criteria are met, the light intensity of said first light effect is based on said second audio content in said second audio channel, and controlling said first lighting device to render said first light effect. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling a plurality of lighting devices to render light effects accompanying a rendering of audiovisual content, said audiovisual content comprising an audio portion and a video portion, said audio portion comprising multiple audio channels.

The executable operations comprise obtaining said audiovisual content, determining a first characteristic of a first audio channel of said multiple audio channels or of an audio object comprised in said audio portion, said first characteristic being indicative of an audio source position, and associating, based on said first characteristic, said first audio channel or said audio object with a first lighting device of said plurality of lighting devices, wherein said associating is based on said audio source position relative to a position of said first lighting device.

The executable operations further comprise determining a second characteristic of a second audio channel of said multiple audio channels, associating, based on said second characteristic, said second audio channel with said first lighting device and with a second lighting device of said plurality of lighting devices, said first audio channel not being associated with said second lighting device, determining whether second audio content in said second audio channel meets one or more predetermined criteria, determining at least a chromaticity based on said video portion of said audiovisual content, determining a first light effect based on said determined chromaticity, wherein if said one or more predetermined criteria are not met, the light intensity of said first light effect is based on first audio content in said first audio channel, and if said one or more predetermined criteria are met, the light intensity of said first light effect is based on said second audio content in said second audio channel, and controlling said first lighting device to render said first light effect.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
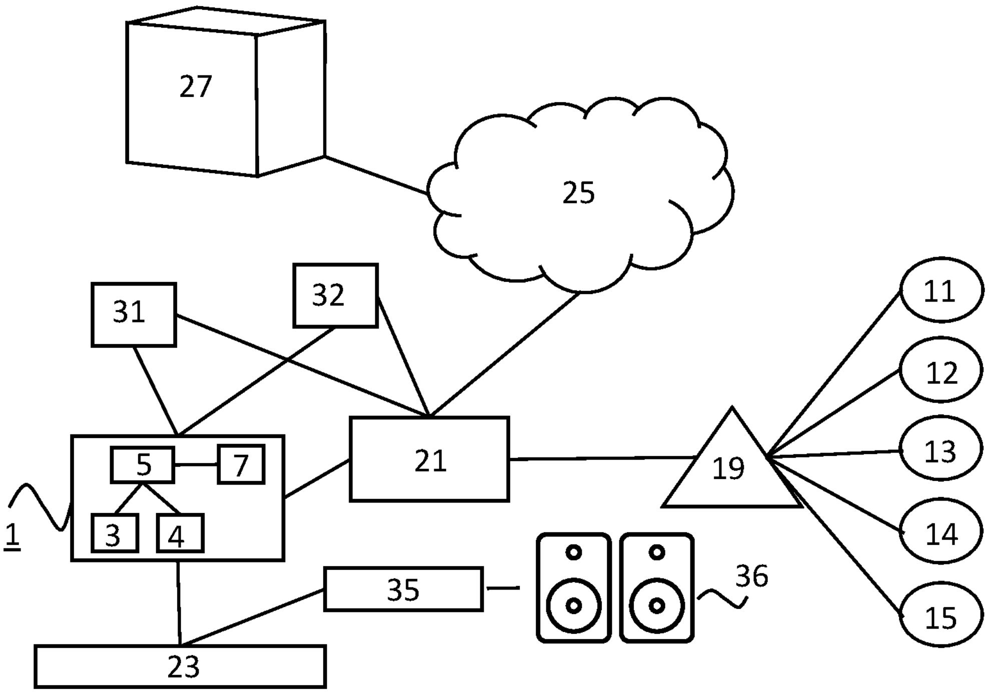
FIG. 1 is a block diagram of a first embodiment of the system.

FIG. 1 shows a first embodiment of the system for controlling a plurality of lighting devices to render light effects accompanying a rendering of audiovisual content: an HDMI module 1. The audiovisual content comprises an audio portion and a video portion. The audio portion comprising multiple audio channels. The HDMI module 1 may be a Hue Play HDMI Sync Box, for example. In the example of FIG. 1, the HDMI module 1 controls five lighting devices 11-15.

In the example of FIG. 1, The HDMI module 1 can control lighting devices 11-15 via a bridge 19. The bridge 19 may be a Hue bridge, for example. The bridge 19 communicates with lighting devices 11-15, e.g., using Zigbee technology. The HDMI module 1 is connected to a wireless LAN access point 21, e.g., via Wi-Fi. The bridge 19 is also connected to the wireless LAN access point 21, e.g., via Wi-Fi or Ethernet.

Alternatively or additionally, the HDMI module 1 may be able to communicate directly with the bridge 19, e.g. using Zigbee technology, and/or may be able to communicate with the bridge 19 via the Internet/cloud. Alternatively or additionally, the HDMI module 1 may be able to control lighting devices 11-15 without a bridge, e.g. directly via Wi-Fi, Bluetooth or Zigbee or via the Internet/cloud.

The wireless LAN access point 21 is connected to the Internet 25. A media server 27 is also connected to the Internet 25. Media server 27 may be a server of a video-on-demand service such as Netflix, Amazon Prime Video, Hulu, HBO Max, Paramount+, Peacock, Disney+ or Apple TV+, for example. The HDMI module 1 is connected to a display device 23 and local media receivers 31 and 32 via HDMI. The local media receivers 31 and 32 may comprise one or more streaming or content generation devices, e.g., an Apple TV, Microsoft Xbox and/or Sony PlayStation, and/or one or more cable or satellite TV receivers. The display device 23 is connected to an audio system 35, e.g., via HDMI ARC. The audio system 35 is connected to speakers 36.

In an alternative embodiment, the system for controlling a plurality of lighting devices to render light effects accompanying a rendering of audiovisual content is a display device. In this alternative embodiment, HDMI module logic may be built-in in the display device. Media receivers 31 and 32 may then also be comprised in the display device, e.g., a smart TV.

The HDMI module 1 comprises a receiver 3, a transmitter 4, a processor 5, and memory 7. The processor 5 is configured to obtain the audiovisual content via receiver 3 from media receiver 31 or 32, determine a first characteristic of a first audio channel of the multiple audio channels or of an audio object comprised in the audio portion, and associate, based on the first characteristic, the first audio channel or the audio object with a first lighting device of the lighting devices 11-15. The first characteristic is indicative of an audio source position and the associating is based on the audio source position relative to a position of the first lighting device.

The processor 5 is further configured to determine a second characteristic of a second audio channel of the multiple audio channels and associate, based on the second characteristic, the second audio channel with the first lighting device and with a second lighting device of the lighting devices 11-15. The first audio channel is not associated with the second lighting device.

The processor 5 is further configured to determine whether second audio content in the second audio channel meets one or more predetermined criteria, determine at least a chromaticity based on the video portion of the audiovisual content, determine a first light effect based on the determined chromaticity, and control, via the transmitter 4, the first lighting device to render the first light effect.

If the one or more predetermined criteria are not met, the light intensity of the first light effect is based on first audio content in the first audio channel or in the audio object, and if the one or more predetermined criteria are met, the light intensity of the first light effect is based on the second audio content in the second audio channel.

In the embodiment of the HDMI module 1 shown in FIG. 1, the HDMI module 1 comprises one processor 5. In an alternative embodiment, the HDMI module 1 comprises multiple processors. The processor 5 of the HDMI module 1 may be a general-purpose processor, e.g., ARM-based, or an application-specific processor. The processor 5 of the HDMI module 1 may run a Unix-based operating system for example. The memory 7 may comprise one or more memory units. The memory 7 may comprise solid-state memory, for example.

The receiver 3 and the transmitter 4 may use one or more wired or wireless communication technologies such as Zigbee to communicate with the bridge 19 and HDMI to communicate with the display device 23 and with local media receivers 31 and 32, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The HDMI module 1 may comprise other components typical for a network device such as a power connector. The invention may be implemented using a computer program running on one or more processors.

In the embodiment of FIG. 1, the system of the invention is an HDMI module. In an alternative embodiment, the system may be another device, e.g., a mobile device, laptop, personal computer, a bridge, a media rendering device, a streaming device, or an Internet server. In the embodiment of FIG. 1, the system of the invention comprises a single device. In an alternative embodiment, the system comprises multiple devices.

Figure 2:
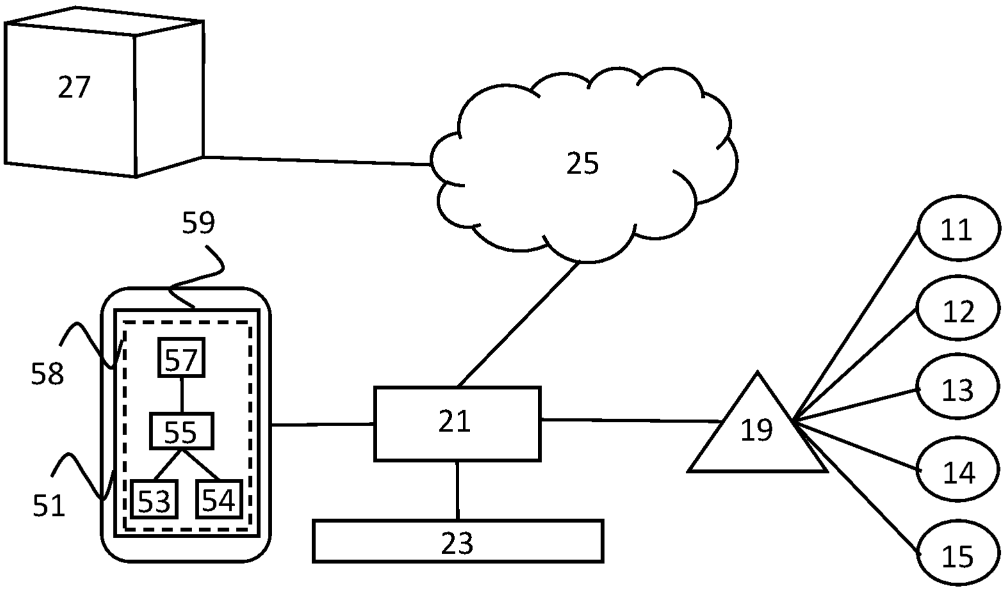
FIG. 2 is a block diagram of a second embodiment of the system.

FIG. 2 shows a second embodiment of the system for controlling a plurality of lighting devices to render light effects accompanying a rendering of audiovisual content: a mobile device 51. The mobile device 51 may be a smart phone or a tablet, for example. The lighting devices 11-15 can be controlled by the mobile device 51 via the bridge 19. The mobile device 51 is connected to the wireless LAN access point 21, e.g., via Wi-Fi.

The mobile device 51 comprises a receiver 53 a transmitter 54, a processor 55, a memory 57, and a display 59. The video portion is preferably displayed on the display device 23 but could also be displayed on display 59 of the mobile device 51. In the former case, the audio portion may be rendered on the display device 23 or on an audio system (not shown in FIG. 2) connected to the display device 23, for example.

The processor 55 is configured to obtain the audiovisual content via receiver 53, determine a first characteristic of a first audio channel of the multiple audio channels or of an audio object comprised in the audio portion, and associate, based on the first characteristic, the first audio channel or the audio object with a first lighting device of the lighting devices 11-15. The first characteristic is indicative of an audio source position and the associating is based on the audio source position relative to a position of the first lighting device.

The processor 55 is further configured to determine a second characteristic of a second audio channel of the multiple audio channels and associate, based on the second characteristic, the second audio channel with the first lighting device and with a second lighting device of the lighting devices 11-15. The first audio channel is not associated with the second lighting device.

The processor 55 is further configured to determine whether second audio content in the second audio channel meets one or more predetermined criteria, determine at least a chromaticity based on the video portion of the audiovisual content, determine a first light effect based on the determined chromaticity, and control, via the transmitter 54, the first lighting device to render the first light effect.

If the one or more predetermined criteria are not met, the light intensity of the first light effect is based on first audio content in the first audio channel or in the audio object, and if the one or more predetermined criteria are met, the light intensity of the first light effect is based on the second audio content in the second audio channel.

In the embodiment of the mobile device 51 shown in FIG. 2, the mobile device 51 comprises one processor 55. In an alternative embodiment, the mobile device 51 comprises multiple processors. The processor 55 of the mobile device 51 may be a general-purpose processor, e.g., from ARM or Qualcomm or an application-specific processor. The processor 55 of the mobile device 51 may run an Android or iOS operating system for example. The display 59 may be a touchscreen display, for example. The display 59 may comprise an LCD or OLED display panel, for example. The memory 57 may comprise one or more memory units. The memory 57 may comprise solid state memory, for example.

The receiver 53 and the transmitter 54 may use one or more wireless communication technologies such as Wi-Fi (IEEE 802.11) to communicate with the wireless LAN access point 21, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 53 and the transmitter 54 are combined into a transceiver. The mobile device 51 may further comprise a camera (not shown). This camera may comprise a CMOS or CCD sensor, for example. The mobile device 51 may comprise other components typical for a mobile device such as a battery and a power connector. The invention may be implemented using a computer program running on one or more processors.

In the embodiment of FIG. 2, lighting devices 11-15 are controlled via the bridge 19. In an alternative embodiment, one or more of lighting devices 11-15 are controlled without a bridge, e.g., directly via Bluetooth. If lighting devices 11-15 are controlled without a bridge, use of wireless LAN access point 21 may not be necessary. Mobile device may be connected to the Internet 25 via a mobile communication network, e.g., 5G, instead of via the wireless LAN access point 21.

Figure 3:
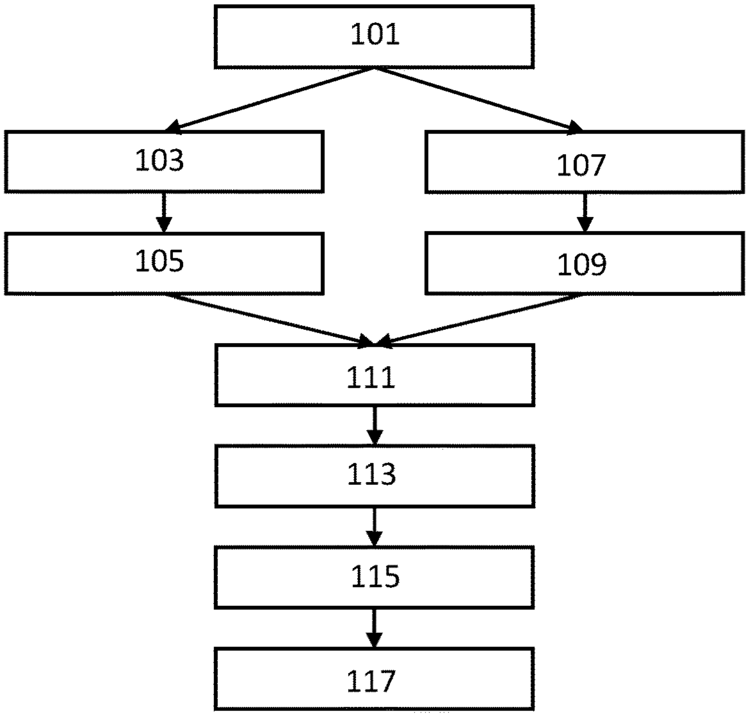
FIG. 3 is a flow diagram of a first embodiment of the method.

A first embodiment of the method of controlling a plurality of lighting devices to render light effects accompanying a rendering of audiovisual content is shown in FIG. 3. The audiovisual content comprises an audio portion and a video portion. The audio portion comprises multiple audio channels. The method may be performed by the HDMI module 1 of FIG. 1 or the mobile device 51 of FIG. 2, for example.

A step 101 comprises obtaining audiovisual content. A step 103 and a step 107 are performed after step 101. Step 103 comprises determining a first characteristic of a first audio channel of the multiple audio channels or of an audio object comprised in the audio portion. The first characteristic is indicative of an audio source position. In many audio formats, most of the audio channels are associated with desired speaker position in the room, e.g., front left, front right, center. Some audio formats like Dolby Atmos and DTS: X support the use of audio objects. An audio object is normally associated with a position of the audio object in a virtual 3D space.

A step 105 comprises obtaining the position of the first lighting device, e.g., an x/y/z position. This may be done manually, but may also be automated, e.g., via RF-sensing. Step 105 further comprises associating, based on the first characteristic determined in step 103, the first audio channel or the audio object with a first lighting device of the plurality of lighting devices, wherein the associating is based on the audio source position relative to the position of the first lighting device.

Step 107 comprises determining a second characteristic of a second audio channel of the multiple audio channels. A step 109 comprises associating, based on the second characteristic determined in step 107, the second audio channel with the first lighting device and with a second lighting device of the plurality of lighting devices. The first audio channel is not associated with the second lighting device. For example, a low frequency effects (abbreviated as LFE) channel may be associated with all lighting devices in a room or a left audio channel (at listener level or at height level) may be associated with multiple lighting devices on the left side of the room.

In the embodiment of FIG. 3, steps 103 and 105 are performed at least partly in parallel with steps 107 and 109. In an alternative embodiment, step 107 is performed after step 105 or step 103 is performed after step 109.

A step 111 is performed after steps 105 and 109 have been completed. Step 111 comprises determining whether second audio content in the second audio channel meets one or more predetermined criteria. For example, step 111 may comprise determining whether an audio intensity of the second audio content exceeds a threshold. Next, a step 113 comprises determining at least a chromaticity (and optionally the entire color) based on the video portion of the audiovisual content.

A step 115 comprises determining a first light effect based on the determined chromaticity and based on a light intensity. If the one or more predetermined criteria are not met, the light intensity of the first light effect is based on first audio content in the first audio channel. If the one or more predetermined criteria are met, the light intensity of the first light effect is based on the second audio content in the second audio channel.

Additionally, the light intensity of the first light effect may depend on the distance between a speaker (or a position of an audio object, e.g., rendered using multiple speakers) and the lighting device that renders the first light effect. In this case, if two lighting devices are located on the left, for example, but one is farther away from the left channel speaker(s), the adjustment for the lighting device farther away may be less than for the one that is closer. A step 117 comprises controlling the first lighting device to render the first light effect determined in step 115.

Figure 4:
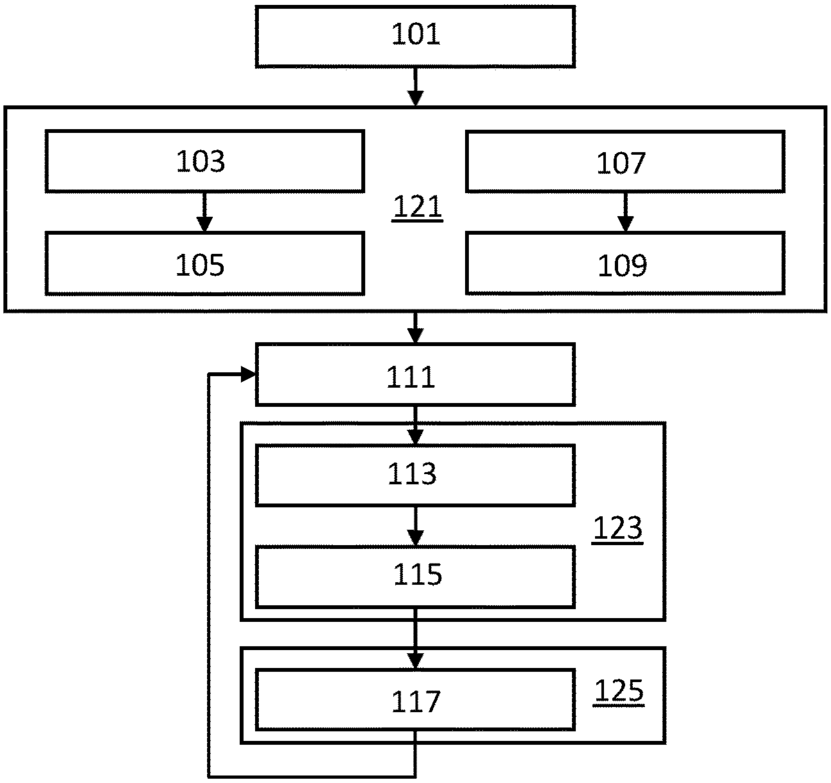
FIG. 4 is a flow diagram of a second embodiment of the method.

A second embodiment of the method of controlling a plurality of lighting devices to render light effects accompanying a rendering of audiovisual content is shown in FIG. 4. The audiovisual content comprises an audio portion and a video portion. The audio portion comprises multiple audio channels. The method may be performed by the HDMI module 1 of FIG. 1 or the mobile device 51 of FIG. 2, for example.

Step 101 comprises obtaining audiovisual content. In a step 121, a mapping from audio channel to lighting device is determined. First, a characteristic of each audio channel is determined. Certain audio channels are associated with an audio source position and in this case, the determined characteristic is indicative of this audio source position. For example, a front left channel in a Dolby Digital-encoded audio portion is associated with a desired front left speaker position. However, not all audio channels are associated with an audio source position. An example is the LFE (subwoofer) channel.

Step 121 comprises determining the positions, e.g., x/y/z positions, of all lighting devices of the plurality of lighting devices. This may be done manually, but may also be automated e.g., via RF-sensing. The characteristic determined for the LFE audio channel (also referred to in this embodiment as the second audio channel) indicates that it is an LFE channel and is not indicative of an audio source position, because humans are not able to locate the source of low frequency sounds. The LFE audio channel is therefore associated with all lighting devices of the plurality of lighting devices in step 121.

The other audio channels (also referred to in this embodiment as the first audio channels) are associated with lighting devices based on the audio source position associated with the respective audio channel and the position of the respective lighting device. For example, the front left audio channel may be associated with a front left lighting device. The type and capability of a lighting device may influence how the mapping between audio channel and lighting device is made. Furthermore, the type and capability of a lighting device may also influence how the brightness and chromaticity are determined for this lighting device in step 123. For example, a point light source may be treated differently from a linear light source like a light strip.

Step 111 comprises determining whether second audio content in the second audio channel, i.e., the LFE audio channel, meets one or more predetermined criteria. In the embodiment of FIG. 4, step 111 comprises determining whether an audio intensity of the second audio content exceeds a threshold.

Next, the light effects are determined for the plurality of lighting devices in step 123. A chromaticity is determined for each of the light effects based on the video portion of the audiovisual content. Moreover, a light intensity is determined for each of the light effects. The chromaticity is extracted from a certain spatial region of the video frames of the video portion. In this embodiment, this spatial region depends on the position of the lighting device. For example, a chromaticity for a light effect to be rendered by a lighting device on the left is extracted from a region on the left side of the video frames and a chromaticity for a light effect to be rendered by a lighting device on the right is extracted from a region on the right side of the video frames.

In the embodiment of FIG. 4, the light intensity of the light effects is based only on the audio portion of the audiovisual content. In an alternative embodiment, the light intensity of the light effects is also based on the video portion of the audiovisual content. For example, an intensity may be extracted from the same spatial region from which the chromaticity is extracted, and this intensity may then be adjusted based on the audio portion. The adjusted intensity is then used as the light effect's light intensity.

If it was determined in step 111 that the audio intensity in the second audio channel, i.e., the LFE audio channel, did not exceed the threshold, the light intensity of a light effect for a certain lighting device is determined based on the first audio content in the first audio channel associated with that lighting device. For example, the light intensity for a front left lighting device is then determined based the audio content in the front left audio channel.

If it was determined in step 111 that the audio intensity in the second audio channel, i.e., the LFE audio channel, exceeded the threshold, the light intensity of each light effect of each lighting device is determined based on the second audio content in the second audio channel. In the embodiment of FIG. 4, the light intensity is only based on the second audio content in this case. In an alternative embodiment, the light intensity of a light effect for a certain lighting device is determined based on both the first audio content in the first audio channel associated with that lighting device and the second audio content in the second audio channel, i.e., the LFE audio channel.

Next, step 125 comprises controlling the lighting devices to render the light effects determined in step 123. Step 111 is repeated after step 125, and the method then proceeds as shown in FIG. 4. Since the characteristics of the audio channels normally do not change during the audiovisual content, step 121 is not repeated (for the same audiovisual content) in this embodiment. In the embodiment of FIG. 4, the audiovisual content is entirely obtained before the light effects are determined. In an alternative embodiment, the audiovisual content may be streamed and thus obtained in parts. In this alternative embodiment, step 121 may be performed after the first part of the audiovisual content has been obtained, for example.

Figure 5:
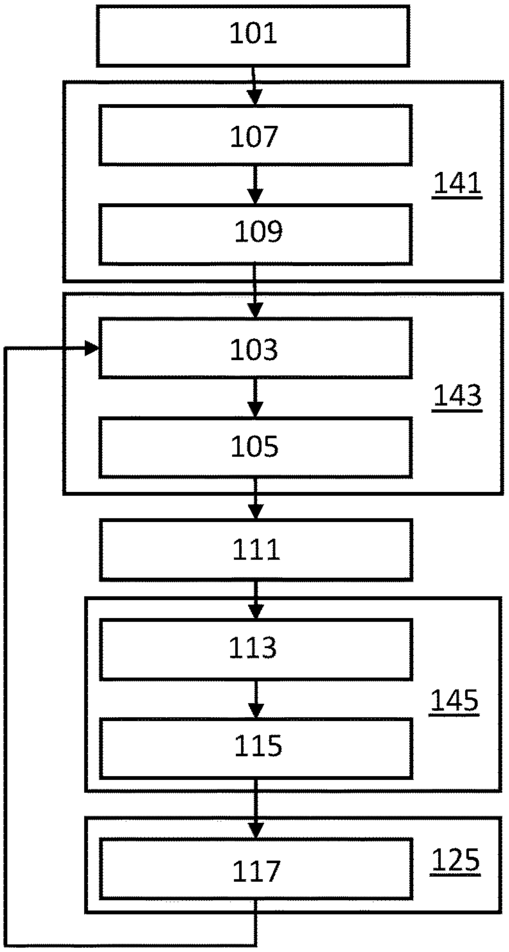
FIG. 5 is a flow diagram of a third embodiment of the method.

A third embodiment of the method of controlling a plurality of lighting devices to render light effects accompanying a rendering of audiovisual content is shown in FIG. 5. The audiovisual content comprises an audio portion and a video portion. The audio portion comprises multiple audio channels. The method may be performed by the HDMI module 1 of FIG. 1 or the mobile device 51 of FIG. 2, for example.

Step 101 comprises obtaining audiovisual content. In a step 141, a mapping from audio channel to lighting device is determined. Step 141 of FIG. 5 is similar to step 121 of FIG. 4 except that associating the LFE audio channel with all lighting devices of the plurality of lighting devices is optional. For example, the LFE audio channel may not be associated with any of the lighting devices. If the LFE audio channel is not associated with all lighting devices of the plurality of lighting devices, the LFE audio channel is not treated as a second audio channel.

If the LFE audio channel is not associated with all lighting devices of the plurality of lighting devices, then one or more other audio channels are associated with multiple lighting devices. These one or more other audio channels are then treated as second audio channels. In this case, one or more second characteristics indicative of respective desired speaker positions are determined for the one or more second audio channels.

For example, a front left audio channel may be associated with two lighting devices on the left of the room. When the audio portion comprises both a front left audio channel and a surround left audio channel, the front left audio channel may be mapped to a front left lighting device and the surround left audio channel may be mapped to a front rear lighting device or both audio channels may be mapped to both lighting devices. The same principle may be used for right audio channels and applies when the audio portion comprises rear audio channels and/or height audio channels. A left audio channel and a right audio channel are preferably not mapped to the same lighting device.

Optionally, both the LFE audio channel and the above-mentioned one or more other audio channels may be treated as second audio channels if the LFE audio channel is associated with all lighting devices of the plurality of lighting devices.

In a step 143, a mapping from audio object to lighting device is determined. For example, an audio object may represent a plane that flies from left to right and may be mapped to different lighting devices depending on its position. A first characteristic indicative of a current audio source position is determined of the audio object.

Step 111 comprises determining whether second audio content in the second audio channel meets one or more predetermined criteria. If there is more than one second audio channel, this may be done for each second audio channel. In the embodiment of FIG. 5, step 111 comprises determining whether an audio intensity of the second audio content exceeds a threshold.

Next, the light effects are determined for the plurality of lighting devices in a step 145. A chromaticity is determined for each of the light effects based on the video portion of the audiovisual content, as described in relation to step 123 of FIG. 4. Moreover, a light intensity is determined for each of the light effects.

In the embodiment of FIG. 5, the light intensity of the light effects is determined (in step 145) based on both the audio portion and the video portion of the audiovisual content. The intensity is extracted from the same spatial region from which the chromaticity is extracted, and this intensity is then adjusted based on the audio portion. The adjusted intensity is then used as the light effect's light intensity.

If the second audio channel is not (just) the LFE audio channel, then in step 145, it is determined for each respective lighting device which respective second audio channel has been associated with the respective lighting device, if any. If a lighting device was not associated with a second audio channel in step 141 and an audio object was not associated with the lighting device in step 143, then the light intensity is not adjusted. If a lighting device was not associated with a second audio channel in step 141 and an audio object was associated with the lighting device in step 143, then the light intensity is adjusted based only on the first audio content in the audio object.

If a lighting device was associated with a second audio channel in step 141 and it was determined in step 111 that the audio intensity in the second audio channel did not exceed the threshold, then the light intensity of a light effect for the lighting device is not adjusted based on the second audio content in this second audio channel. If the lighting device was associated with an audio object in step 143, then the light intensity is adjusted based on the first audio content in the audio object.

If a lighting device was associated with a second audio channel in step 141 and it was determined in step 111 that the audio intensity in the second audio channel exceeded the threshold, then the light intensity of a light effect for the lighting device is adjusted based on the second audio content in this second audio channel. In this case, if the lighting device has been associated with an audio object, then the light intensity is further adjusted based on the first audio content in the audio object in the embodiment of FIG. 5. In an alternative embodiment, the light intensity is adjusted based only on the second audio content in this second audio channel in this case.

Optionally, step 145 comprises determining the light intensities of the light effects further based on information on available speakers and/or information on used three-dimensional audio virtualization. For example, if a user only has front speakers and a center speaker and his audio system does not support three-dimensional audio virtualization, it may be better not to adjust the light intensity of a light effect rendered on a lighting device in the rear of a room based on audio content of a first audio channel or audio object with an audio source position in the rear of the room, as this would create a contradiction between the rendered light effects and the rendered audio.

Step 125, described in relation to FIG. 4, is performed after step 145. Step 143 is repeated after step 125, after which the method proceeds as shown in FIG. 5. Since the characteristics of the audio channels normally do not change during the audiovisual content, unlike the characteristics of the audio objects, step 141 is not repeated in this embodiment. In the embodiment of FIG. 5, the audiovisual content is entirely obtained before the light effects are determined. In an alternative embodiment, the audiovisual content may be streamed and thus obtained in parts. In this alternative embodiment, step 141 may be performed after the first part of the audiovisual content has been obtained, for example.

Figure 6:
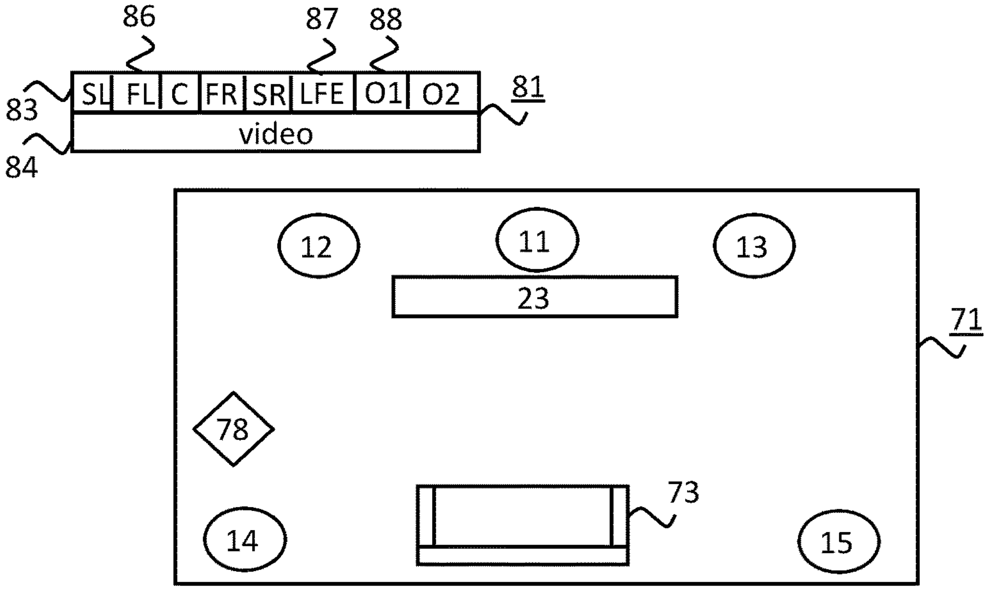
FIG. 6 shows an example of a room in which five entertainment lights have been installed.

FIG. 6 shows an example of a room 71 in which five entertainment lighting devices 11-15 have been installed. Lighting device 11 has been installed behind display device 23. Lighting device 12 has been installed left of display device 23. Lighting device 13 has been installed right of display device 23. Lighting devices 11-13 have been installed at the front of the room. Lighting devices 14-15 have been installed at the rear of the room. Lighting device 14 has been installed left of a couch 73. Lighting device 15 has been installed right of the couch 73.

Video content 81 comprises a video portion 84 and an audio portion 83. In this example, the audio portion 83 comprises six audio channels (5.1 audio channels to be precise): a surround left channel, a front left channel 86, a center channel, a front right channel, a surround right channel, and a low frequency effects channel 87. In an alternative example, the audio portion 83 may comprise more or less than six audio channels. The audio portion further comprises two audio objects: a first audio object 88 and a second audio object 89. In practice, an audio portion which comprises audio objects will comprise more than two audio objects.

In a first usage example, the method of FIG. 4 is used, and the surround left channel, front left channel 86, center channel, front right channel, and the surround right channel are mapped to lighting devices 14,13,11, 13, and 15, respectively. These audio channels are treated as first audio channels. Additionally, the low frequency effects channel 87 is associated with all the lighting devices 11-15. The low frequency effects channel 87 is treated as second audio channel. When there is a loud effect on the low frequency effects channel 87, the light intensity of the light effects rendered on lighting devices 11-15 is relatively high.

In a second usage example, the method of FIG. 5 is used, and the audio object 88 is rendered at a virtual source position 78. Like in the first usage example, the low frequency effects channel 87 is associated with all the lighting devices 11-15. The low frequency effects channel 87 is treated as a second audio channel. When there is a loud effect on the low frequency effects channel 87, the light intensity of the light effects rendered on lighting devices 11-15 is relatively high.

In this case, the light effect rendered by the lighting device nearest to the virtual source position 78, i.e., lighting device 14, may be even higher than the light effect rendered by the other lighting devices. When there is no loud effect on the low frequency effects channel 87, only the light intensity of the light effect rendered by the lighting device nearest to the virtual source position 78 is relatively high, and not the light intensities of the light effects rendered by the other lighting devices.

In a third usage example, the method of FIG. 5 is used, and the audio object 88 is rendered at a virtual source position 78. The surround left channel and the front left channel 86 are combined and the combined left channel is associated with both lighting device 12 and lighting device 14. Furthermore, the surround right channel and the front right channel are combined, and the combined right channel is associated with both lighting device 13 and lighting device 15. These combined audio channels are treated as second audio channels. Alternatively, the surround channels may be absent, and the front left channel and front right channel are then treated as second audio channels.

When there is a loud effect on the combined left audio channel, the light intensity of the light effects rendered on lighting devices 12 and 14 is relatively high. In this case, the light effect rendered by the lighting device nearest to the virtual source position 78, i.e., lighting device 14, may be even higher than the light effect rendered by the other lighting device, i.e., lighting device 12. When there is no loud effect on the combined left audio channel, only the light intensity of the light effect rendered by the lighting device nearest to the virtual source position 78, i.e., lighting device 14, is relatively high, and not the light intensity of the light effect rendered by lighting device 12.

Figure 7:
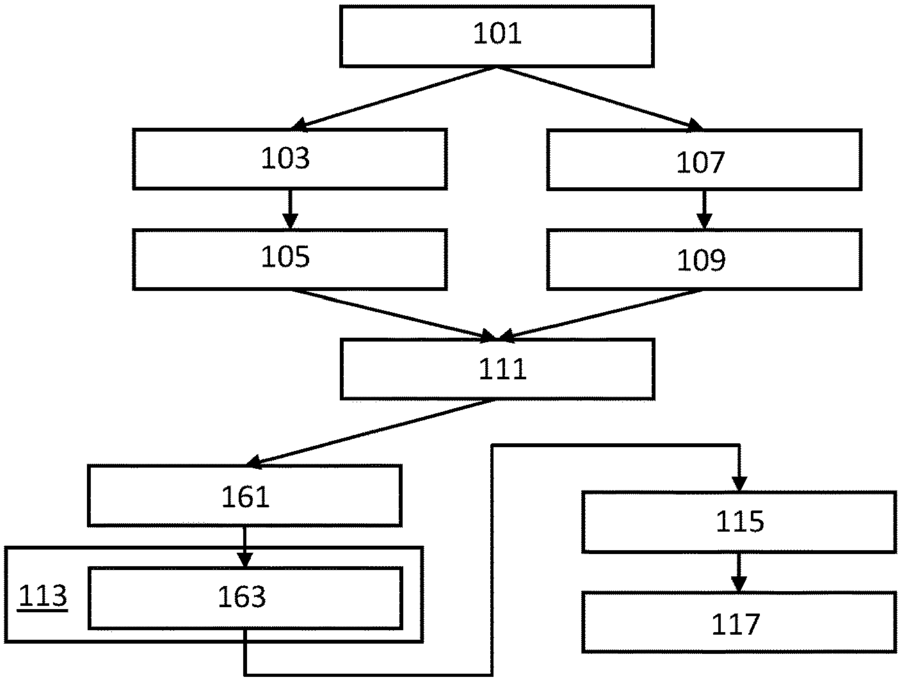
FIG. 7 is a flow diagram of a fourth embodiment of the method.

A fourth embodiment of the method of controlling a plurality of lighting devices to render light effects accompanying a rendering of audiovisual content is shown in FIG. 7. The fourth embodiment is an extension of the first embodiment of FIG. 3. In the embodiment of FIG. 7, step 113 of FIG. 3 is implemented by a step 163 and a step 161 is performed between steps 111 and 163.

Step 161 comprises selecting a spatial region in a current frame of the video portion in dependence on whether the one or more predetermined criteria are met, as determined in step 111. Step 163 comprises extracting the chromaticity from (only) the spatial region selected in step 161. If an intensity is also extracted from the video portion, as described for example in relation to FIG. 5, then this intensity is also extracted only from (only) the selected spatial region.

As an example, when the loudness of the LFE channel does not exceed a threshold, a spatial region on the left of the video frames is selected for a front left lighting device. When the loudness of the LFE channel exceeds the threshold, a spatial region in the center of the video frames is selected for the front left lighting device.

Figure 8:
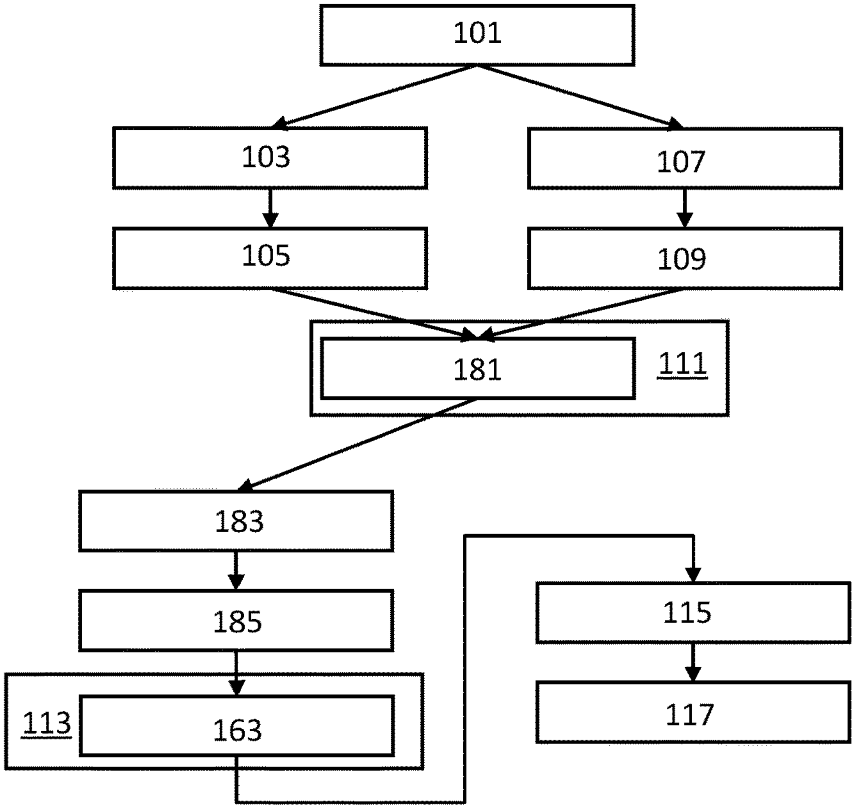
FIG. 8 is a flow diagram of a fifth embodiment of the method.

A fifth embodiment of the method of controlling a plurality of lighting devices to render light effects accompanying a rendering of audiovisual content is shown in FIG. 8. The fifth embodiment is an extension of the first embodiment of FIG. 3. In the embodiment of FIG. 8, step 113 of FIG. 3 is implemented by step 163, like in the embodiment of FIG. 7. Furthermore, in the embodiment of FIG. 8, step 111 is implemented by a step 181 and steps 183 and 185 are performed between steps 181 and 163.

Step 181 comprises determining whether an audio intensity of the second audio content in the second audio channel exceeds a threshold. Step 183 comprises determining whether an audio intensity of the first audio content in the first audio channel exceeds a further threshold, which may be the same as the threshold.

Steps 185 comprises selecting a spatial region in a current frame of the video portion in dependence on whether the audio intensity of the first audio content exceeds the further threshold, as determined in step 183, and optionally also in dependence on whether the audio intensity of the second audio content exceeds the threshold, as determined in step 181. Step 163 comprises extracting the chromaticity from (only) the spatial region selected in step 185.

Figure 9:
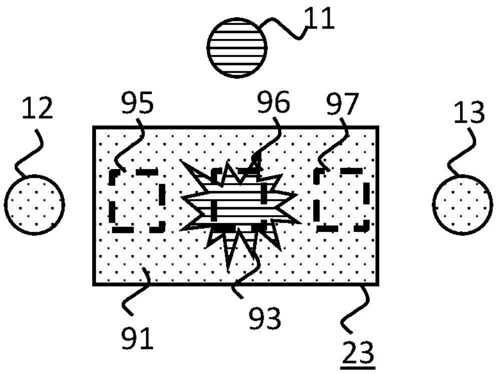
FIG. 9 shows an example of lights being controlled with the method of FIG. 8 when the second audio channel is loud and the first audio channels are not.
Figure 10:
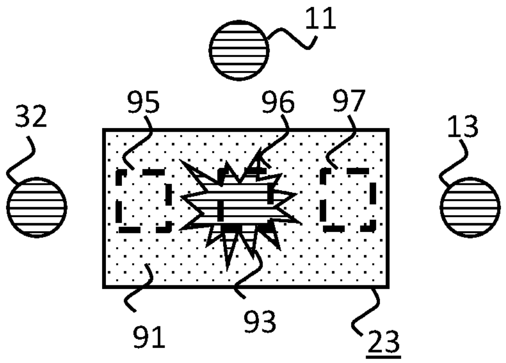
FIG. 10 shows an example of lights being controlled with the method of FIG. 8 when both the second audio channel and the first audio channels are loud.

With the method of FIG. 8, the light intensity of the light effects (of all lighting devices) is relatively high if there is a loud event on the LFE audio channel and the chromaticity of a light effect rendered on a certain lighting device depends on whether there is loud event on the first audio channel associated with this lighting device. For example, the loudness of the first audio channel may control if the chromaticity for light effects is taken from the part of the screen assigned to it (e.g., left) or from the screen center. This is shown in FIGS. 9 and 10. Optionally, the louder the sound effect, the more color may be taken from the screen center.

FIG. 9 shows an example of lighting devices being controlled with the method of FIG. 8 when the second audio channel is loud and the first audio channel(s) are not loud. In this case, the light intensity of the light effects rendered by the lighting devices 11-13 is relatively high and the chromaticity to be used for the light effects rendered by lighting devices 11,12, and 13 is extracted from spatial regions 96, 95, and 97, respectively.

FIG. 10 shows an example of lighting devices being controlled with the method of FIG. 8 when both the second audio channel and the first audio channel(s) are loud. In this case, the light intensity of the light effects rendered by the lighting devices 11-13 is also relatively high. However, the chromaticity to be used for the light effects rendered by lighting devices 11,12, and 13 is extracted only from spatial region 96.

Figure 11:
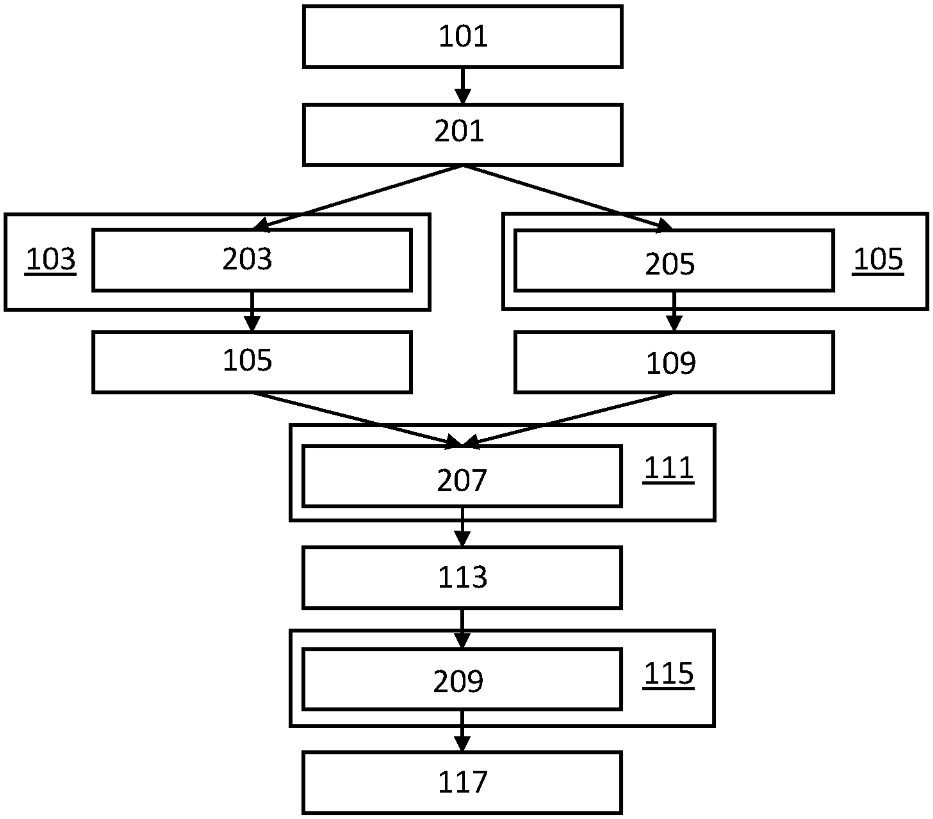
FIG. 11 is a flow diagram of a sixth embodiment of the method.

A sixth embodiment of the method of controlling a plurality of lighting devices to render light effects accompanying a rendering of audiovisual content is shown in FIG. 11. The sixth embodiment is an extension of the first embodiment of FIG. 3. In the embodiment of FIG. 11, step 103 of FIG. 3 is implemented by a step 203, step 105 of FIG. 3 is implemented by a step 205, and a step 201 is performed after step 201 and before steps 203 and 205. Furthermore, step 111 is implemented by a step 207 and step 115 is implemented by a step 209.

Step 201 comprises determining one or more speaker signals for one or more loudspeakers based on the audio portion of the audiovisual content obtained in step 101. In steps 203, the first characteristic of the first audio channel or the audio object is determined based on the one or more speaker signals determined in step 201. In this case, the first characteristic is indicative of a speaker position associated with the first audio channel or the audio object.

In many cases, the audio source position specified by the audio portion is the same as the rendered audio source position. However, there are a few exceptions, including: 1) there is no speaker associated with a certain audio channel in the user's audio system and the certain audio channel, when available, is rendered on a different speaker. For example, certain audio systems can create a speaker signal for height speakers (e.g., in a 5.1.2 audio system) based on rear audio channels (e.g., comprised in a 7.1. audio format). 2) the user's audio system does not use 3D audio virtualization techniques. In this case, it may be better to adjust the light intensity of the lighting device nearest to the speaker rendering the audio object rather than adjust the light intensity of the lighting device nearest to the position of the audio object specified in the audio portion.

In the embodiment of FIG. 11, for the sake of consistency, the second characteristic is also determined based on the one or more speaker signals in step 205, and it is also determined in step 207 whether the audio content in the second audio channels meets the one or more predetermined criteria based on the one or more speaker signals. In step 209, the light intensity of the first light effect is determined based on the one or more speaker signals.

The embodiments of FIGS. 7, 8 and 11 have been described as an extension of FIG. 3. The embodiments of FIGS. 4 and 5 may be extended in a similar manner.

Figure 12:
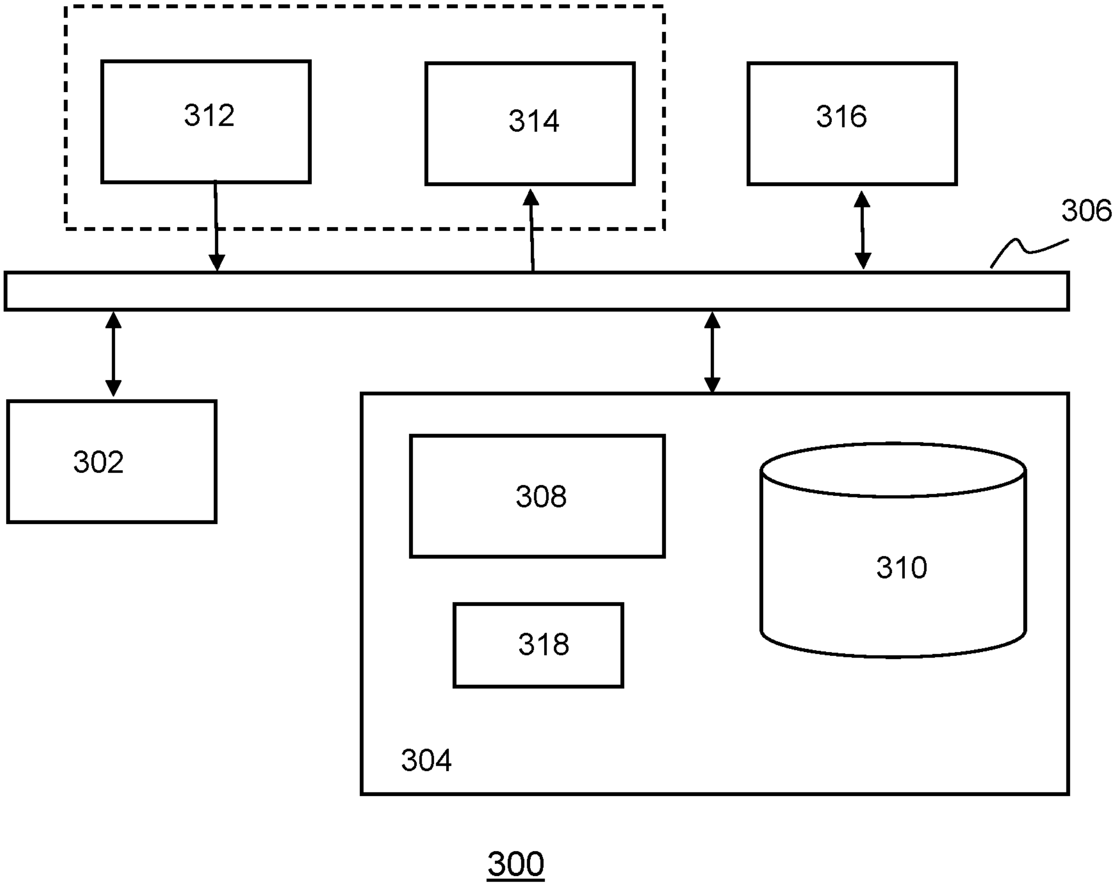
FIG. 12 is a block diagram of an exemplary data processing system for performing the method of the invention.

FIG. 12 depicts a block diagram illustrating an exemplary data processing system that may perform the method as described with reference to FIGS. 3 to 5, 7 to 8, and 11.

As shown in FIG. 12, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g., if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g., for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 12 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 12, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 12) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling a plurality of lighting devices to render light effects accompanying a rendering of audiovisual content, said audiovisual content comprising an audio portion and a video portion, said audio portion comprising multiple audio channels, said system comprising:
- at least one input interface;
- at least one transmitter; and
- at least one processor configured to:
- obtain said audiovisual content via said at least one input interface,
- determine a first characteristic of a first audio channel of said multiple audio channels or of an audio object comprised in said audio portion, said first characteristic being indicative of an audio source position,
- associate, based on said first characteristic, said first audio channel or said audio object with a first lighting device of said plurality of lighting devices, wherein said associating is based on said audio source position relative to a position of said first lighting device,
- determine a second characteristic of a second audio channel of said multiple audio channels,
- associate, based on said second characteristic, said second audio channel with said first lighting device and with a second lighting device of said plurality of lighting devices, said first audio channel not being associated with said second lighting device, determine whether second audio content in said second audio channel meets one or more predetermined criteria, determine at least a chromaticity based on said video portion of said audiovisual content, determine a first light effect based on said determined chromaticity, wherein if said one or more predetermined criteria are not met, the light intensity of said first light effect is based on first audio content in said first audio channel or in said audio object, and if said one or more predetermined criteria are met, the light intensity of said first light effect is based on said second audio content in said second audio channel, and control, via said at least one transmitter, said first lighting device to render said first light effect.

2. A system as claimed in claim 1, wherein said at least one processor is configured to determine the light intensity of said first light effect further based on said first audio content in said first audio channel or in said audio object if said one or more predetermined criteria are met.

3. A system as claimed in claim 1, wherein said at least one processor is configured to determine the light intensity of said first light effect further based on said video portion of said audiovisual content.

4. A system as claimed in claim 1, wherein said second characteristic is not indicative of an audio source position.

5. A system as claimed in claim 4, wherein said second characteristic indicates whether said second audio channel is a low frequency effect channel.

6. A system as claimed in claim 1, wherein said first characteristic is determined of said audio object and said second characteristic is indicative of a desired speaker position for said second audio channel.

7. A system as claimed in claim 1, wherein said at least one processor is configured to determine whether said second audio content in said second audio channel meets said one or more predetermined criteria by determining whether an audio intensity of said second audio content exceeds a threshold.

8. A system as claimed in claim 1, wherein said at least one processor is configured to:

select a spatial region in a current frame of said video portion in dependence on whether said one or more predetermined criteria are met, and determine at least said chromaticity from only said selected spatial region.

9. A system as claimed in claim 1, wherein said first characteristic is determined of said first audio channel and said at least one processor is configured to:

determine whether an audio intensity of said first audio content exceeds a threshold, select a spatial region in a current frame of said video portion in dependence on whether said audio intensity of said first audio content exceeds said threshold, and determine at least said chromaticity from only said selected spatial region.

10. A system as claimed in claim 1, wherein said at least one processor is configured to determine one or more speaker signals for a loudspeaker based on said audio portion of said audiovisual content.

11. A system as claimed in claim 10, wherein said at least one processor is configured to determine the light intensity of said first light effect based on said one or more speaker signals.

12. A system as claimed in claim 1, wherein said at least one processor is configured to determine the light intensity of said first light effect further based on information on available speakers and/or information on used three-dimensional audio virtualization.

13. A method of controlling a plurality of lighting devices to render light effects accompanying a rendering of audiovisual content, said audiovisual content comprising an audio portion and a video portion, said audio portion comprising multiple audio channels, said method comprising:

obtaining said audiovisual content;

determining a first characteristic of a first audio channel of said multiple audio channels or of an audio object comprised in said audio portion, said first characteristic being indicative of an audio source position;

associating, based on said first characteristic, said first audio channel or said audio object with a first lighting device of said plurality of lighting devices, wherein said associating is based on said audio source position relative to a position of said first lighting device;

determining a second characteristic of a second audio channel of said multiple audio channels;

associating, based on said second characteristic, said second audio channel with said first lighting device and with a second lighting device of said plurality of lighting devices, said first audio channel not being associated with said second lighting device;

determining whether second audio content in said second audio channel meets one or more predetermined criteria;

determining at least a chromaticity based on said video portion of said audiovisual content;

determining a first light effect based on said determined chromaticity, wherein if said one or more predetermined criteria are not met, the light intensity of said first light effect is based on first audio content in said first audio channel, and if said one or more predetermined criteria are met, the light intensity of said first light effect is based on said second audio content in said second audio channel; and controlling said first lighting device to render said first light effect.

14. A computer program product for a computing device, the computer program product comprising computer program code to perform the method of claim 13 when the computer program product is run on a processing unit of the computing device.

* * * * *